United States Patent
Chen et al.

(10) Patent No.: US 11,962,042 B2
(45) Date of Patent: Apr. 16, 2024

(54) BATTERY CELL, MANUFACTURING METHOD AND MANUFACTURING SYSTEM THEREFOR, BATTERY AND ELECTRIC DEVICE

(71) Applicant: CONTEMPORARY AMPEREX TECHNOLOGY CO., LIMITED, Ningde (CN)

(72) Inventors: Wenwei Chen, Ningde (CN); Yulian Zheng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/887,310

(22) Filed: Aug. 12, 2022

(65) Prior Publication Data

US 2022/0393315 A1 Dec. 8, 2022

Related U.S. Application Data

(63) Continuation of application No. PCT/CN2021/091365, filed on Apr. 30, 2021.

(51) Int. Cl.
*H01M 50/531* (2021.01)
*H01M 50/147* (2021.01)
*H01M 50/55* (2021.01)

(52) U.S. Cl.
CPC ....... *H01M 50/531* (2021.01); *H01M 50/147* (2021.01); *H01M 50/55* (2021.01); *H01M 2220/20* (2013.01)

(58) Field of Classification Search
CPC .. H01M 50/531; H01M 50/55; H01M 50/147; H01M 2220/20
See application file for complete search history.

(56) References Cited

U.S. PATENT DOCUMENTS 11,121,440 B2 * 9/2021 Takabayashi ......... H01M 50/55
2016/0099457 A1 4/2016 Park et al.
(Continued)

FOREIGN PATENT DOCUMENTS

CN 104221186 A 12/2014
CN 205376658 U 7/2016
(Continued)

OTHER PUBLICATIONS

International Search Report and Written Opinion, PCT/CN2021/091365, dated Feb. 7, 2022, 10 pgs.
(Continued)

*Primary Examiner* — Milton I Cano
*Assistant Examiner* — Mary G Henshaw
(74) *Attorney, Agent, or Firm* — XSENSUS LLP

(57) ABSTRACT

Embodiments of the application provide a battery cell, a manufacturing method and a manufacturing system therefor, a battery and an electric device. The battery cell according to an embodiment of the application includes: a casing having an opening; an electrode assembly, accommodated in the casing and including a tab portion; an end cover assembly, including an end cover configured to cover the opening and an electrode terminal mounted on the end cover, the end cover being provided with a first through hole; and a current collecting member, configured to electrically connect the electrode terminal and the tab portion. According to the application, impurities attached to the electrode assembly can be reduced during assembly, thereby improving the safety performance of the battery cell.

19 Claims, 14 Drawing Sheets

(56) References Cited

U.S. PATENT DOCUMENTS

| | | | |
|---|---|---|---|
| 2018/0062123 A1* | 3/2018 | Ikeda | H01M 50/528 |
| 2018/0090738 A1* | 3/2018 | Ono | H01M 50/147 |
| 2018/0294447 A1* | 10/2018 | Guo | H01M 50/193 |
| 2019/0067650 A1* | 2/2019 | Li | H01M 50/188 |
| 2020/0144584 A1 | 5/2020 | Zeng et al. | |
| 2020/0251694 A1* | 8/2020 | Wakimoto | H01M 50/528 |
| 2023/0124030 A1* | 4/2023 | Imabori | H01M 50/553 |
| | | | 429/184 |

FOREIGN PATENT DOCUMENTS

| | | |
|---|---|---|
| CN | 206250260 U | 6/2017 |
| CN | 109860449 A | 6/2019 |
| CN | 209183657 U | 7/2019 |
| CN | 110326124 A | 10/2019 |
| CN | 212161993 U | 12/2020 |
| CN | 112332039 A | 2/2021 |
| JP | 2002-343336 A | 11/2002 |
| JP | 2019-053863 A | 4/2019 |
| JP | 2020-053207 A | 4/2020 |
| KR | 2016-0042243 A | 4/2016 |
| WO | 2021/060010 A1 | 4/2021 |

OTHER PUBLICATIONS

Office Action dated Jun. 8, 2023, in corresponding Chinese patent Application No. 202180006925.5, with Concise Explanation of Relevance, 13 pages.

Contemporary Amperex Technology Co., Limited, Extended European Search Report, EP21918108.8, dated Apr. 3, 2023, 10 pgs.

Office Action dated Aug. 21, 2023, in corresponding Japanese patent Application No. 2022-545922, 8 pages.

Office Action dated Aug. 23, 2023, in corresponding Chinese patent Application No. 202180006925.5, 32 pages.

Office Action dated Dec. 20, 2023, in corresponding Chinese patent Application No. 202180006925.5, 54 pages.

* cited by examiner

BATTERY CELL, MANUFACTURING METHOD AND MANUFACTURING SYSTEM THEREFOR, BATTERY AND ELECTRIC DEVICE

CROSS REFERENCE TO RELATED APPLICATIONS

This application is a continuation application of PCT Patent Application No. PCT/CN2021/091365, entitled "BATTERY CELL, MANUFACTURING METHOD AND MANUFACTURING SYSTEM THEREFOR, BATTERY AND ELECTRIC DEVICE" filed on Apr. 30, 2021, which is incorporated herein by reference in its entirety.

TECHNICAL FIELD

The application relates to the technical field of batteries, and in particular to a battery cell, a manufacturing method and a manufacturing system therefor, a battery and an electric device.

BACKGROUND

Rechargeable battery cells, which can be called secondary battery cells, refer to battery cells that can be recharged to activate active materials and continue to be used after the battery cells are discharged. Rechargeable battery cells are widely used in electronic devices such as mobile phones, laptops, battery cars, electric vehicles, electric aircrafts, electric boats, electric toy cars, electric toy boats, electric toy planes, electric tools, etc.

In the development of battery technology, safety is also an issue that cannot be ignored in addition to improving the performance of battery cells. If the safety of battery cells cannot be guaranteed, the battery cells cannot be used. Therefore, how to improve the safety of battery cells is an urgent technical issue to be solved in battery technology.

SUMMARY OF THE INVENTION

The application provides a battery cell, a manufacturing method and a manufacturing system therefor, a battery and an electric device, which can improve the safety of the battery cell.

In a first aspect, an embodiment of the application provides a battery cell, including:
a casing provided with an opening;
an electrode assembly, accommodated in the casing and including a tab portion;
an end cover assembly, including an end cover configured to cover the opening and an electrode terminal mounted on the end cover, the end cover being provided with a first through hole; and
a current collecting member, configured to electrically connect the electrode terminal and the tab portion, where the current collecting member includes a first connecting portion for connecting the tab portion, and projection of a connecting region of the first connecting portion and the tab portion in a thickness direction of the end cover at least partially overlaps with projection of the first through hole in the thickness direction.

In the above solution, according to the embodiment of the application, the current collecting member can be connected to the tab portion after the end cover is connected to the casing by forming the first through hole on the end cover. When connecting the current collecting member to the electrode terminal, the electrode assembly is not connected to the current collecting member, therefore, impurities produced when connecting the current collecting member to the electrode terminal will not be sputtered onto the electrode assembly. When connecting the first connecting portion of the current collecting member to the tab portion, the electrode assembly is accommodated in an accommodating cavity formed by the casing and the end cover, such that the casing and the end cover can act as a barrier, thereby reducing the risk that impurities in the environment are attached to the electrode assembly, and improving the safety performance of the battery cell.

In some embodiments, the first connecting portion is located at one side, facing the end cover, of the tab portion, and includes a base portion and a protrusion portion connected to the base portion, the protrusion portion protrudes with respect to a surface, facing the tab portion, of the base portion. The protrusion portion is configured to connect the tab portion to form the connecting region. The protrusion portion is configured to be pressed against the tab portion, such that the protrusion portion is in close contact with the tab portion, which is convenient for connecting the protrusion portion with the tab portion by an external device.

In some embodiments, the base portion is in contact with the tab portion to increase the current passing area between the current collecting member and the tab portion and increase the current passing capacity.

In some embodiments, one side, away from the tab portion, of the protrusion portion is provided with a recessed portion recessed with respect to a surface, away from the electrode assembly, of the base portion. The protrusion portion can be formed by a stamping process, and a recessed portion is formed at a stamped position of the current collecting member.

In some embodiments, the battery cell further includes a first insulating member, at least part of the first insulating member is accommodated in the recessed portion and covers the connecting region. The first insulating member can fix metallic particles produced when connecting the first connecting portion with the tab portion, thereby reducing the risk that the metallic particles fall into the electrode assembly. The recessed portion can locate the first insulating member to facilitate assembly of the first insulating member. In addition, the recessed portion can also provide a space for the first insulating member to reduce the space occupied by the current collecting member and the first insulating member in a thickness direction.

In some embodiments, the battery cell further includes a second insulating member which is arranged at one side, away from the tab portion, of the first connecting portion and covers the connecting region.

In some embodiments, the end cover assembly includes a third insulating member arranged at one side, facing the electrode assembly, of the end cover, the first connecting portion is located between the third insulating member and the tab portion. The third insulating member is provided with a second through hole, and the projection of the connecting region in the thickness direction at least partially overlaps with projection of the second through hole in the thickness direction. The third insulating member is configured to separate the electrode assembly from the end cover to reduce the risk of short circuit. The second through hole is configured to expose the first connecting portion, and the first connecting portion is connected with the tab portion through the first through hole and the second through hole by an external device.

In some embodiments, the end cover assembly includes a fourth insulating member connected to the third insulating member, the fourth insulating member is arranged at one side, away from the electrode assembly, of the third insulating member and covers the second through hole. The fourth insulating member is configured to insulate the end cover from the first connecting portion to prevent the first connecting portion from electrically connecting the end cover through the second through hole.

In some embodiments, at least part of the fourth insulating member is accommodated in the first through hole. The first through hole can reserve a space for the fourth insulating member, such that the fourth insulating member can have a sufficient thickness to reduce the risk that the fourth insulating member is pierced by impurities.

In some embodiments, the third insulating member is provided with a first groove recessed with respect to a surface, facing the end cover, of the third insulating member. The second through hole extends from a bottom wall of the first groove in the thickness direction. At least part of the fourth insulating member is accommodated in the first groove and connected to the bottom wall of the first groove. The first groove may have a locating function to facilitate assembly of the fourth insulating member.

In some embodiments, the projection of the connecting region in the thickness direction is within the projection of the first through hole in the thickness direction. In the embodiments, it is not necessary to connect a part, that does not overlap with the first through hole in the thickness direction, of the first connecting portion to the tab portion, which can simplify the process of connecting the tab portion to the first connecting portion.

In some embodiments, the first connecting portion is welded to the tab portion to form a welding region included in the connecting region. In the welding region, the resistance between the first connecting portion and the tab portion is low, which facilitates the transmission of current between the first connecting portion and the tab portion.

In some embodiments, the electrode assembly further includes a body portion, the tab portion extends from one end, near the end cover, of the body portion. The body portion is a winding structure and includes bent regions, and the tab portion includes a first part extending from the bent regions, with at least part of the first part connected to the first connecting portion.

In some embodiments, the body portion further includes a straight region, with the two bent regions respectively connected to both ends of the body portion. The tab portion further includes a second part extending from the straight region, with at least part of the second part connected to the first connecting portion.

In some embodiments, the end cover includes an end cover body for connecting the casing, and a sealing plate for sealing the first through hole to ensure the tightness of the battery cell.

In some embodiments, the end cover body includes a second groove recessed with respect to a surface, away from the electrode assembly, of the end cover body. The first through hole extends from a bottom wall of the second groove in the thickness direction. The sealing plate is at least partially accommodated in the second groove and abuts against the bottom wall of the second groove. The second groove may have a locating function to facilitate assembly of the sealing plate and the end cover body. The second groove can also provide an accommodating space for the sealing plate to reduce the overall size of the end cover in the thickness direction.

In some embodiments, a surface, away from the electrode assembly, of the end cover body is flush with a surface, away from the electrode assembly, of the sealing plate, which prevents the sealing plate from occupying additional space in the thickness direction and improves the energy density of the battery cell.

In a second aspect, an embodiment of the application provides a battery, including a box and the battery cell according to any one of the embodiments of the first aspect, the battery cell is accommodated in the box.

In a third aspect, an embodiment of the application provides an electric device, including the battery of the second aspect, the battery is configured to provide electrical energy.

In a fourth aspect, an embodiment of the application provides a method for manufacturing a battery cell, including:
  providing a casing provided with an opening;
  providing an electrode assembly including a tab portion, and putting the electrode assembly into the casing;
  providing an end cover assembly including an end cover and an electrode terminal, the electrode terminal being mounted on the end cover with a first through hole;
  providing a current collecting member and connecting the current collecting member to the electrode terminal; and
  covering the end cover over the opening;
  where the current collecting member is configured to electrically connect the electrode terminal and the tab portion, and includes a first connecting portion for connecting the tab portion, and projection of a connecting region of the first connecting portion and the tab portion in a thickness direction of the end cover at least partially overlaps with projection of the first through hole in the thickness direction.

In a fifth aspect, an embodiment of the application provides a system for manufacturing a battery cell, including:
  a first supply device, configured to supply a casing having an opening;
  a second supply device, configured to supply an electrode assembly including a tab portion, and put the electrode assembly into the casing;
  a third supply device, configured to supply an end cover assembly including an end cover and an electrode terminal, the electrode terminal being mounted on the end cover with a first through hole;
  a fourth supply device, configured to supply a current collecting member and connect the current collecting member to the electrode terminal; and
  an assembly device, configured to cover the end cover over the opening;
  where the current collecting member is configured to electrically connect the electrode terminal and the tab portion, and includes a first connecting portion for connecting the tab portion, and projection of a connecting region of the first connecting portion and the tab portion in a thickness direction of the end cover at least partially overlaps with projection of the first through hole in the thickness direction.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

Figure 1:
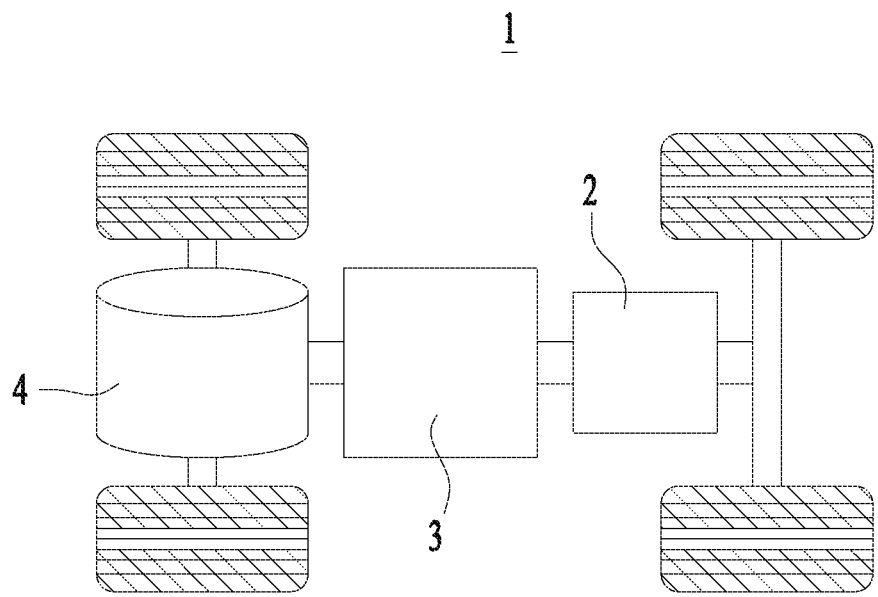
FIG. 1 is a structural schematic diagram of a vehicle provided in some embodiments of the application.

In the drawings, the components are not drawn to actual scale.

DETAILS OF SPECIFIC EMBODIMENTS

To make the objectives, technical solutions, and advantages of the embodiments of the application clearer, the following will clearly describes the technical solutions in the embodiments of the application with reference to the accompanying drawings in the embodiments of the application. Apparently, the described embodiments are some rather than all of the embodiments of the application. Based on the embodiments of the application, all other embodiments obtained by those of ordinary skill in the art without making creative efforts fall within the scope of protection of the application.

Unless otherwise defined, all technical and scientific terms used in the application have the same meanings as those commonly understood by those who belong to the technical field of the present application. In the application, the terms used in the specification of the application are merely for the purpose of describing specific embodiments, and are not intended to limit the application. The terms "including" and "having" and any variations thereof in the specification and claims of the application and the above accompanying drawings are intended to cover non-exclusive inclusion. The terms "first", "second", etc. in the specification and claims of the application or the above accompanying drawings are used to distinguish different objects, but not to describe a specific order or primary and secondary relationship.

Reference to an "embodiment" in the application means that a specific feature, structure or characteristic described in conjunction with an embodiment may be included in at least one embodiment of the application. The appearance of this phrase in various places in the specification does not necessarily mean the same embodiment, nor is it an independent or alternative embodiment mutually exclusive with other embodiments.

In the description of the application, it should be noted that, unless otherwise explicitly specified and defined, the terms "mounting", "connecting", "connection" and "attachment" should be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the application could be understood according to specific circumstances.

As used herein, the term "and/or" is merely used to describe an associated relationship between associated objects and means three relationships, for example, A and/or B may mean A alone, A and B together, and B alone. In addition, the character "/" in the application generally indicates that the associated objects are an "or" relationship.

In the embodiments of the application, the same reference numerals refer to same components, and for the sake of brevity, detailed descriptions of the same components are omitted in different embodiments. It should be understood that a thickness, a length, a width and other dimensions of various components and an overall thickness, length, width and other dimensions of an integrated device shown in the accompanying drawings in the embodiments of the application are merely exemplary, and should not constitute any limitation on the application.

The term "plurality" in the application means two or more.

In the application, battery cells may include a lithium ion secondary battery cell, a lithium ion primary battery cell, a lithium-sulfur battery, a sodium lithium-ion battery cell, a sodium ion battery cell, a magnesium ion battery cell, etc., which are not limited by the embodiments of the application. The battery cell may be in cylindrical, flat, cuboid or other shapes, which is not limited by the embodiments of the application. Generally, the battery cells are divided into three types according to packaging manners: cylindrical battery cells, square battery cells and pouch battery cells, which are not limited by the embodiments of the application.

The battery mentioned in the embodiments of the application refers to a single physical module which includes one or a plurality of battery cells and therefore provides a higher voltage and capacity. For example, the battery mentioned in the application may include a battery module or a battery pack, etc. Generally, the battery includes a box for packaging one or a plurality of battery cells. The box may prevent liquid or other foreign matter from affecting charging or discharging of the battery cell.

The battery cell includes an electrode assembly and an electrolyte, and the electrode assembly includes a positive pole piece, a negative pole piece and a separator. The battery cell works mainly depending on movement of metal ions between the positive pole piece and the negative pole piece.

The positive pole piece includes a positive current collector and a positive active material layer coated on a surface of the positive current collector; the positive current collector includes a positive current collecting portion and a positive protrusion portion protruding from the positive current collecting portion, the positive current collecting portion is coated with the positive active material layer, at least part of the positive protrusion portion is not coated with the positive active material layer, and the positive protrusion portion serves as a positive tab. Taking a lithium ion battery as an example, the positive current collector may be made of aluminum, and the positive active material layer includes a positive active material which may be lithium cobaltate, lithium iron phosphate, ternary lithium or lithium manganate. The negative pole piece includes a negative current collector and a negative active material layer coated on a surface of the negative current collector; the negative current collector includes a negative current collecting portion and a negative protrusion portion protruding from the negative current collecting portion, the negative current collecting portion is coated with the negative active material layer, at least part of the negative protrusion portion is not coated with the negative active material layer, and the negative protrusion portion serves as a negative tab. The negative current collector may be made of copper, and the negative active material layer includes a negative active material which may be carbon or silicon. In order to guarantee fusing does not occur during large current flow, a plurality of positive tabs are stacked together, and a plurality of negative tabs are stacked together. The separator may be made of polypropylene (PP) or polyethylene(PE). In addition, the electrode assembly may be in a winding structure or a laminated structure, which is not limited in the embodiments of the application.

The battery cell further includes a casing and an end cover assembly, the casing is configured to accommodate the electrode assembly and has an opening; the end cover assembly includes an end cover and an electrode terminal mounted on the end cover; and the end cover is connected to the casing and covers the opening to form an accommodating cavity for accommodating the electrode assembly and an electrolyte. In a general battery cell, an electrode assembly is electrically connected to an electrode terminal through a current collecting member. In the related art, the electrode assembly is generally connected to the current collecting member first, and then the electrode assembly is put into the casing. However, the inventor found that impurities (especially metallic particles) tend to attach to the electrode assembly in the process of connecting the electrode assembly to the current collecting member, triggering potential safety hazards.

In view of this, an embodiment of the application provides a technical solution, in which a battery cell includes: a casing having an opening; an electrode assembly, accommodated in the casing and including a tab portion; an end cover assembly, including an end cover configured to cover the opening and an electrode terminal mounted on the end cover, the end cover being provided with a first through hole; and a current collecting member, configured to electrically connect the electrode terminal and the tab portion, where the current collecting member includes a first connecting portion for connecting the tab portion, and projection of a connecting region of the first connecting portion and the tab portion in a thickness direction of the end cover at least partially overlaps with projection of the first through hole in the thickness direction. A battery cell with such structure can reduce impurities remaining in the battery cell and reduce the safety risk.

The technical solution described in the embodiment of the application is applicable to batteries and electric devices using the batteries.

The electric devices may be vehicles, mobile phones, portable devices, laptops, ships, spacecraft, electric toys and electric tools. The vehicles may be fuel vehicles, gas vehicles or new energy vehicles, and the new energy vehicles may be battery electric vehicles, hybrid electric vehicles, extended-range vehicles, etc. The spacecrafts include airplanes, rockets, space shuttles, spaceships, etc. The electric toys include fixed or mobile electric toys, such as game machines, electric car toys, electric ship toys and electric airplane toys. The electric tools include metal cutting electric tools, electric grinding tools, electric assembling tools and electric tools for railways, such as electric drills, electric grinders, electric wrenches, electric screwdrivers, electric hammers, impact electric drills, concrete vibrators, electric planers, etc. The embodiment of the application does not impose special restrictions on the above-mentioned electric devices.

For the sake of illustration, the following embodiments are illustrated with a vehicle as an electric device.

FIG. 1 is a schematic structural diagram of a vehicle provided in some embodiments of the application. As shown in FIG. 1, a battery 2 is disposed inside a vehicle 1, and the battery 2 may be disposed at the bottom, head or tail of the vehicle 1. The battery 2 may be used for supplying electricity to the vehicle 1, for example, the battery 2 may be used as an operating power source for the vehicle 1.

The vehicle 1 may further include a controller 3 and a motor 4, where the controller 3 is used for controlling the battery 2 to supply electricity to the motor 4 to be used for, for example, operating electricity requirements during start-up, navigation and running of the vehicle 1.

In some embodiments of the application, the battery 2 may not only serve as the operating power source for the vehicle 1, but also serve as a driving power source for the vehicle 1, so as to replace or partially replace fuel or natural gas to provide driving power for the vehicle 1.

Figure 2:
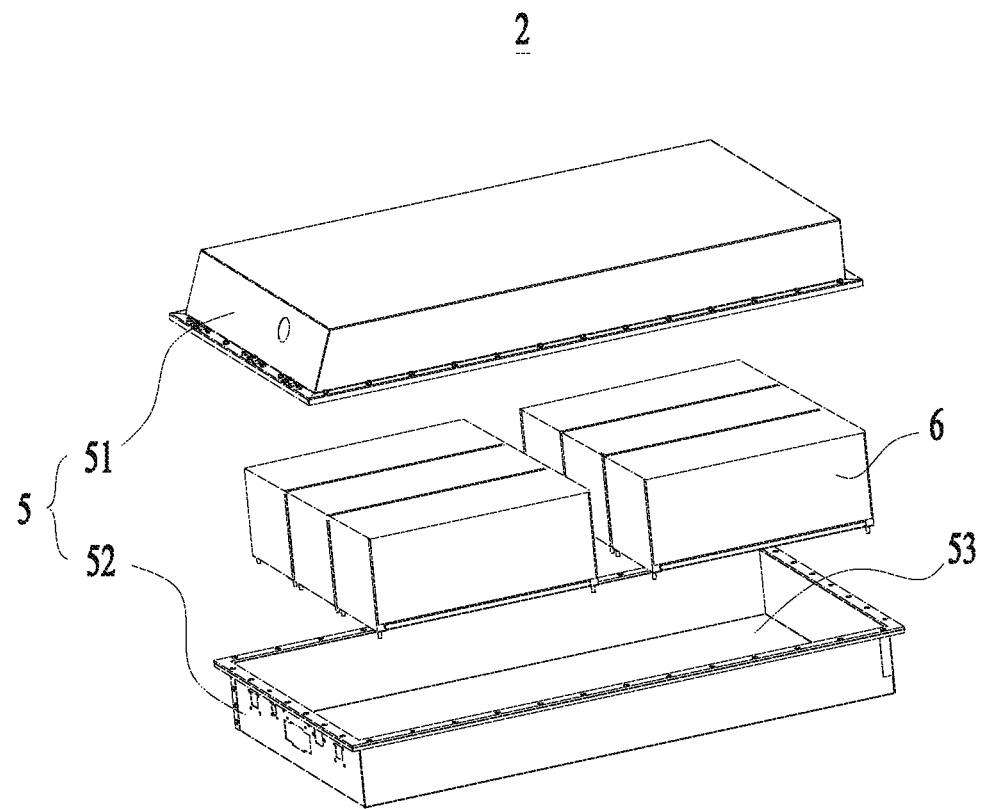
FIG. 2 is an exploded view of a battery provided in some embodiments of the application.

FIG. 2 is an exploded view of a battery provided in some embodiments of the application. As shown in FIG. 2, the battery 2 includes a box 5 and a battery cell (not shown in FIG. 2), and the battery cell is accommodated in the box 5.

The box 5 is used for accommodating the battery cell and may be of various structures. In some embodiments, the box 5 may include a first box portion 51 and a second box portion 52, the first box portion 51 and the second box portion 52 may cover each other, and the first box portion 51 and the second box portion 52 define an accommodating space 53 for accommodating the battery cell together. The second box portion 52 may be of a hollow structure with an opening end, the first box portion 51 is of a plate-like structure, and the first box portion 51 covers an opening side of the second box portion 52 so as to form the box 5 with the accommodating space 53. The first box portion 51 and the second box portion 52 may be both of hollow structures with opening sides, and an opening side of the first box portion 51 covers the opening side of the second box portion 52 so as to form the box 5 with the accommodating space 53. Of course, the first box portion 51 and the second box portion 52 may be in various shapes, such as a cylinder or a cuboid.

In order to improve sealability after the first box portion 51 and the second box portion 52 are connected, a seal, such as a sealant or a seal ring, may be arranged between the first box portion 51 and the second box portion 52.

Assuming that the first box portion 51 covers a top portion of the second box portion 52, the first box portion 51 may also be referred to as an upper box cover, and the second box portion 52 may also be referred to as a lower box.

There may be one or more battery cells in the battery 2. If there are a plurality of battery cells, the plurality of battery cells may be connected in series, in parallel, or in a series-parallel manner. The plurality of battery cells may be directly connected in series, in parallel, or in a series-parallel manner, and then a whole formed by the plurality of battery cells is accommodated in the box 5. Of course, the plurality of battery cells may be connected in series, in parallel, or in a series-parallel manner first to form a battery module 6, and then a plurality of battery modules 6 are connected in series, in parallel, or in a series-parallel manner to form a whole to be accommodated in the box 5.

Figure 3:
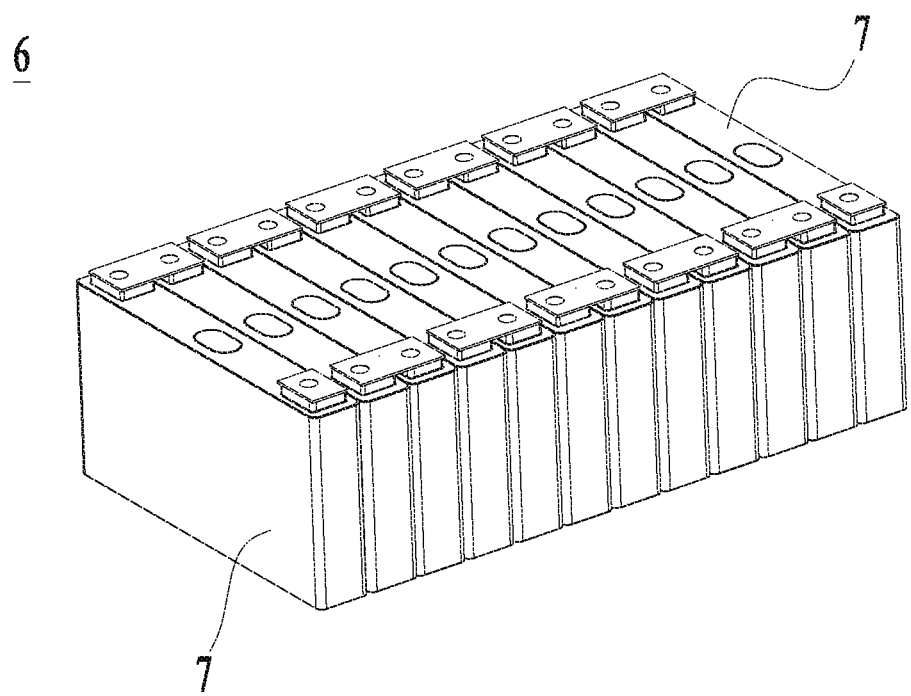
FIG. 3 is a structural schematic diagram of a battery module shown in FIG. 2.

FIG. 3 is a schematic structural diagram of the battery module shown in FIG. 2. As shown in FIG. 3, in some embodiments, a plurality of battery cells 7 are provided, and the plurality of battery cells 7 are connected in series, in parallel or in parallel-series to form battery modules 6, then the plurality of battery modules 6 are connected in series, in parallel or in parallel-series to form a single unit, and are accommodated in the box.

The plurality of battery cells 7 in the battery module 6 may be electrically connected to each other by means of bus components, so as to be connected in series, in parallel, or in a series-parallel manner.

Figure 4:
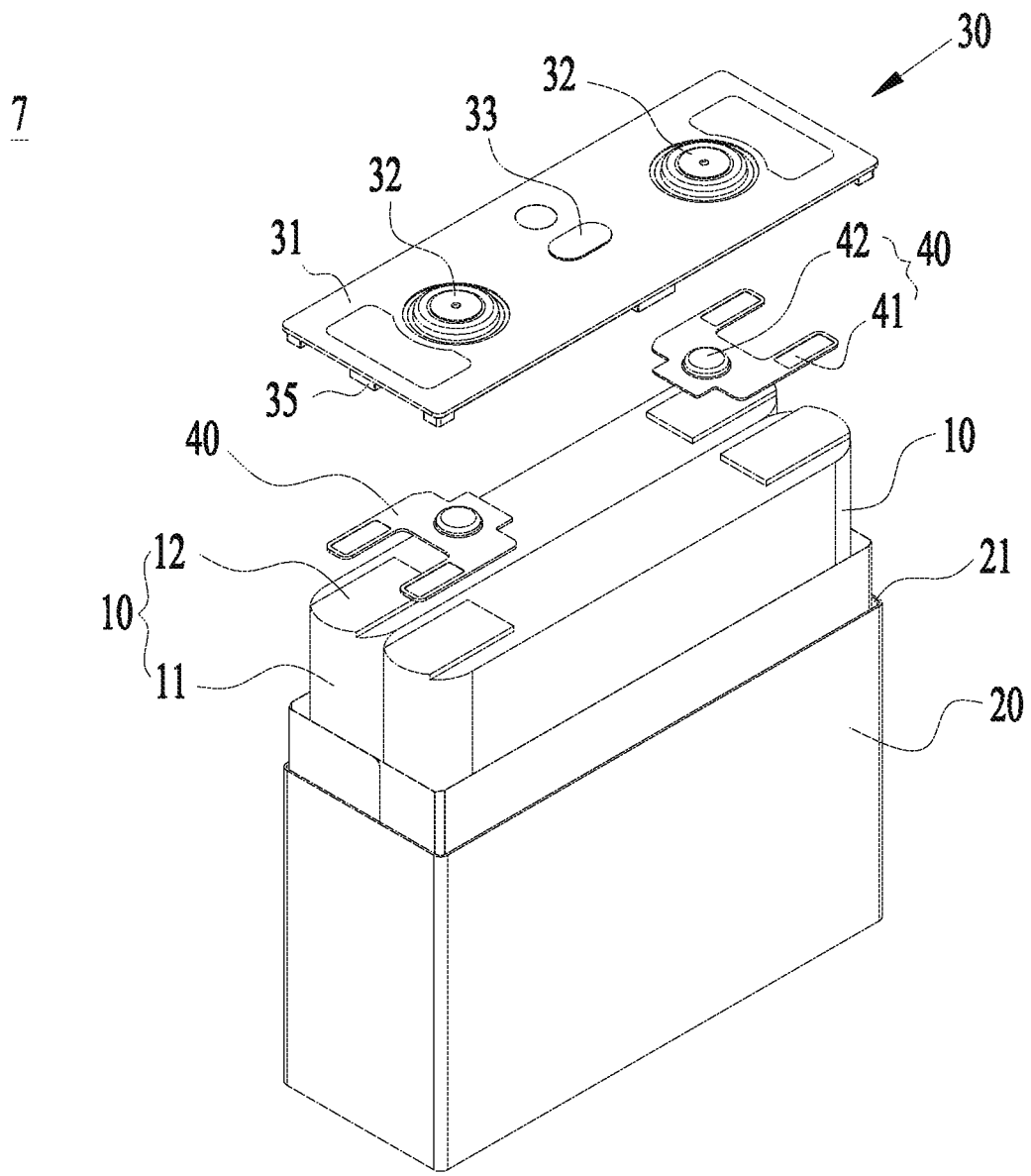
FIG. 4 is an exploded view of a battery cell provided in some embodiments of the application.
Figure 5:
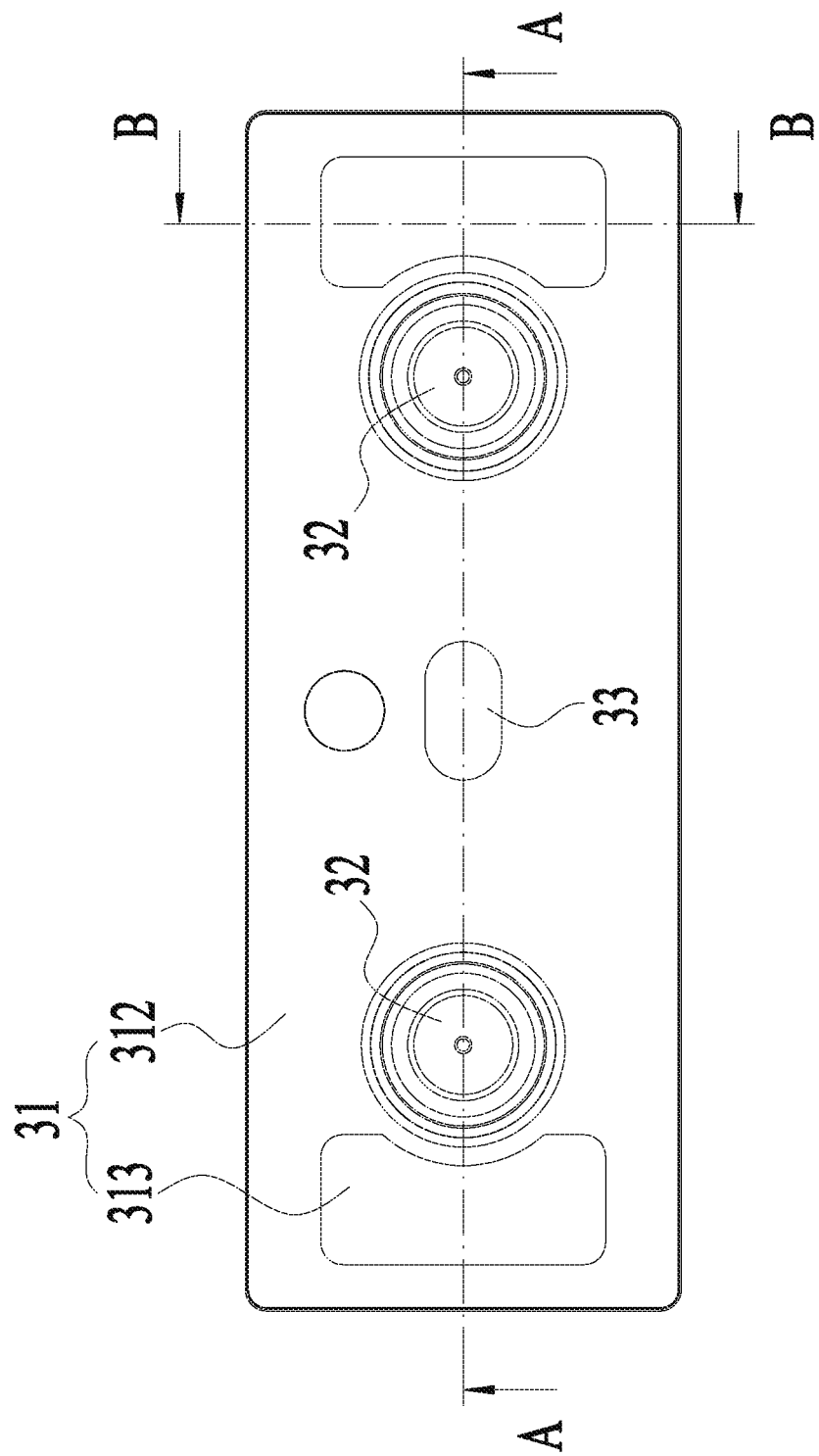
FIG. 5 is a top view of a battery cell provided in some embodiments of the application.

FIG. 4 is an exploded view of a battery cell provided in some embodiments of the application; FIG. 5 is a top view of a battery cell provided in some embodiments of the application; and FIG. 6 is a schematic sectional view of the battery cell shown in FIG. 5 taken along line A-A.

Figure 6:
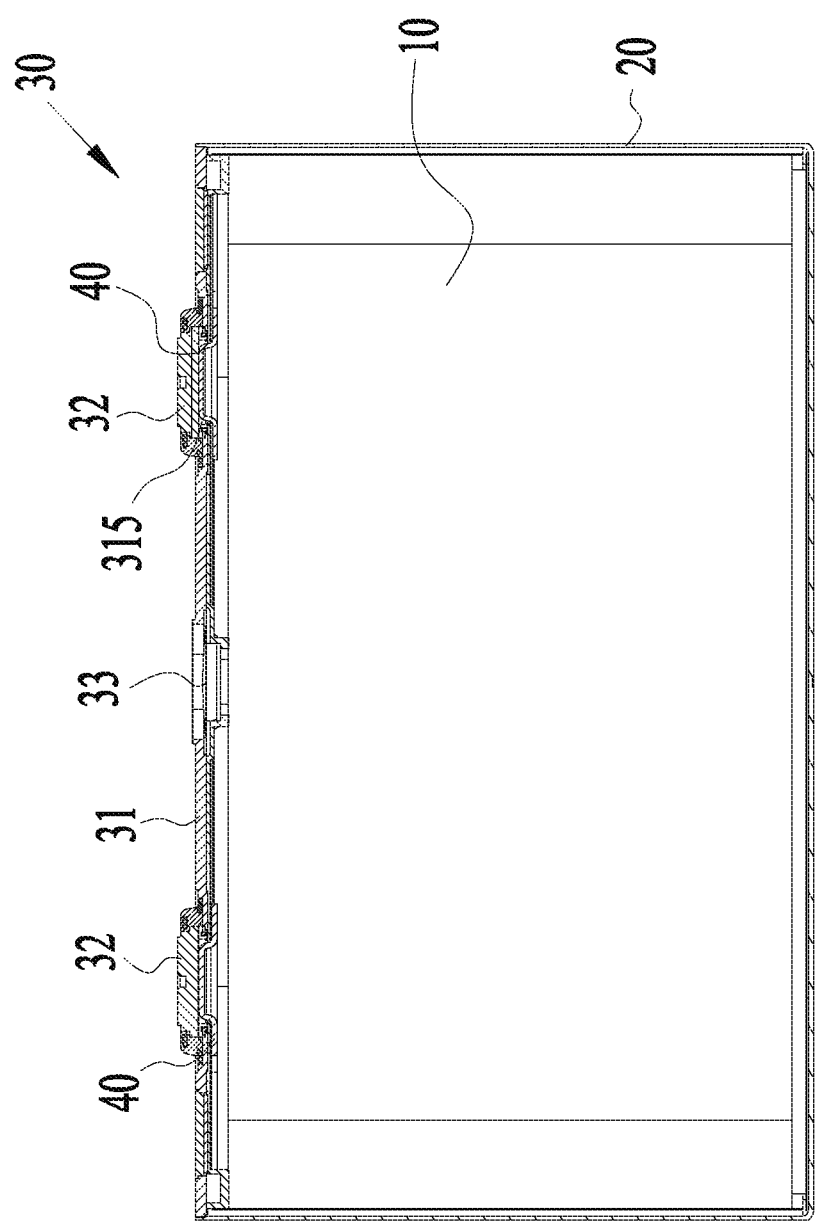
FIG. 6 is a schematic sectional view of the battery cell shown in FIG. 5 taken along line A-A.

As shown in FIG. 4 to FIG. 6, the battery cell 7 in the embodiments of the application includes an electrode assembly 10, an end cover assembly 30 and a casing 20. The end cover assembly 30 includes an end cover 31 and an electrode terminal 32 mounted on the end cover 31. The casing 20 has an opening 21, and the electrode assembly 10 is accommodated in the casing 20.

The electrode assembly 10 includes a positive pole piece, a negative pole piece and a separator. The electrode assembly 10 may be a winding electrode assembly, a laminated electrode assembly or other forms of electrode assembly.

In some embodiments, the electrode assembly 10 is a winding electrode assembly. The positive pole piece, the negative pole piece and the separator are strip structures. According to the embodiments of the application, the positive pole piece, the separator and the negative pole piece may be sequentially laminated and wound for more than two turns to form the electrode assembly 10.

In some other embodiments, the electrode assembly 10 is a laminated electrode assembly. Specifically, the electrode assembly 10 includes a plurality of positive pole pieces and a plurality of negative pole pieces, and the positive pole pieces and the negative pole pieces are alternately laminated in a direction parallel to a thickness direction of the positive pole pieces and a thickness direction of the negative pole pieces.

In terms of the shape, the electrode assembly 10 includes a body portion 11 and a tab portion 12 connected to the body portion 11. Exemplarily, the tab portion 12 extends from one end, near the end cover 31, of the body portion 11.

In some embodiments, two tab portions 12 are provided and defined as a positive tab portion and a negative tab portion respectively. In some examples, the positive tab portion and the negative tab portion extend from the same end of the body portion 11; while in some other examples, the positive tab portion and the negative tab portion extend from opposite ends of the body portion 11 respectively.

As a core part of the electrode assembly 10, the body portion 11 is designed to realize the charging and discharging function, and generates current led out by the tab portion 12. The body portion 11 includes a positive current collecting portion of a positive current collector, a positive active material layer, a negative current collecting portion of a negative current collector, a negative active material layer and a separator. The positive tab portion includes a plurality of positive tabs, and the negative tab portion includes a plurality of negative tabs.

The casing 20 is a hollow structure with one side open, and the end cover 31 covers the opening of the casing 20 to form a sealed connection, so as to form an accommodating cavity for accommodating the electrode assembly 10 and an electrolyte.

The casing 20 may take a variety of shapes, such as cylinder and cuboid. The shape of the casing 20 may be determined according to the specific shape of the electrode assembly 10. For example, if the electrode assembly 10 is of a cylindrical structure, a cylindrical casing may be selected and used. If the electrode assembly 10 is of a cuboid structure, a cuboid casing may be selected and used. Certainly, the end cover 31 may also be a variety of structures, for example, the end cover 31 is a plate-like structure, a hollow structure with one end open, etc. Exemplarily, in FIG. 4, the casing 20 is a cuboid structure, and the end cover 31 is a plate-like structure and covers an opening at the top of the casing 20.

In some embodiments, two electrode terminals 32 are provided and defined as a positive electrode terminal and a negative electrode terminal respectively. The positive electrode terminal and the negative electrode terminal are configured respectively to electrically connect the positive pole piece and the negative pole piece to output electrical energy generated by the electrode assembly 10.

In some embodiments, the end cover assembly 30 further includes a pressure relief mechanism 33 mounted on the end cover 31, the pressure relief mechanism 33 is configured to relieve pressure inside the battery cell 7 when internal pressure or temperature of the battery cell 7 reaches a predetermined value. Exemplarily, the pressure relief mechanism 33 is located between the positive electrode terminal and the negative electrode terminal. The pressure relief mechanism 33 may be a component such as an explosion-proof valve, a rupture disc, an air valve, a pressure relief valve or a safety valve.

In some embodiments, the casing 20 may also be a hollow structure with opposite sides open. The end cover assembly 30 includes two end covers 31 which are respectively covered over two openings of the casing 20 and hermetically connected to form an accommodating cavity for accommodating the electrode assembly 10 and an electrolyte. In some examples, the positive electrode terminal and the negative electrode terminal may be mounted on the same end cover 31, and the positive tab portion and the negative tab portion extend from one end, near the end cover 31, of the body portion 11. In some other examples, the positive electrode terminal and the negative electrode terminal are mounted on two end covers 31 respectively, and the positive tab portion and the negative tab portion extend from both ends, facing the two end covers 31, of the body portion 11 respectively.

In the battery cell 7, there may be one or more electrode assemblies 10 accommodated in the casing 20. Illustratively, in FIG. 4, there are two electrode assemblies 10.

In order to lead current from the electrode assembly 10 to the electrode terminal 32 easily, the battery cell 7 in the embodiments of the application is further provided with a current collecting member 40. The current collecting member 40 is configured to electrically connect the electrode terminal 32 and the tab portion 12. Exemplarily, two current collecting members 40 are provided, one current collecting member 40 is configured to electrically connect the positive electrode terminal and the positive tab portion, and the other current collecting member 40 is configured to electrically connect the negative electrode terminal and the negative tab portion.

In some embodiments, the current collecting member 40 includes a first connecting portion 41 for connecting the tab portion 12 and a second connecting portion 42 for connecting the electrode terminal 32. Exemplarily, the first connecting portion 41 is located at one side, facing the end cover 31, of the tab portion 12.

In some embodiments, the end cover 31 is provided with a terminal hole 315 running through the end cover 31 in a thickness direction of the end cover 31. The electrode terminal 32 is arranged at one side, away from the electrode assembly 10, of the end cover 31 and covers the terminal hole 315. Exemplarily, the second connecting portion 42 protrudes from the first connecting portion 41 and extends into the terminal hole 315 to be connected to the electrode terminal 32. In some embodiments, one side, away from the electrode terminal 32, of the second connecting portion 42, is provided with a concave cavity. The current collecting member 40 may be formed by stamping a metal plate.

In some embodiments, the second connecting portion 42 is secured to the electrode terminal 32 by welding, riveting, bonding or other means.

When assembling the battery cell 7, the inventor tried to connect the electrode assembly to the first connecting portion of the current collecting member, then connect the second connecting portion of the current collecting member to the electrode terminal of the end cover assembly, put the electrode assembly into the casing, and finally connect the casing and the end cover to achieve sealing. However, the inventor found that impurities are produced when connecting the electrode assembly and the current collecting member and connecting the current collecting member and the electrode terminal, the impurities (especially metallic particles) tend to sputter and attach to the electrode assembly, and the impurities may pierce the separator and eclectically connect the positive pole piece and the negative pole piece, thus triggering safety risks.

Based on the above problems discovered by the applicant, the applicant has improved a structure of the battery cell, which will be described in detail below with reference to different embodiments.

Figure 7:
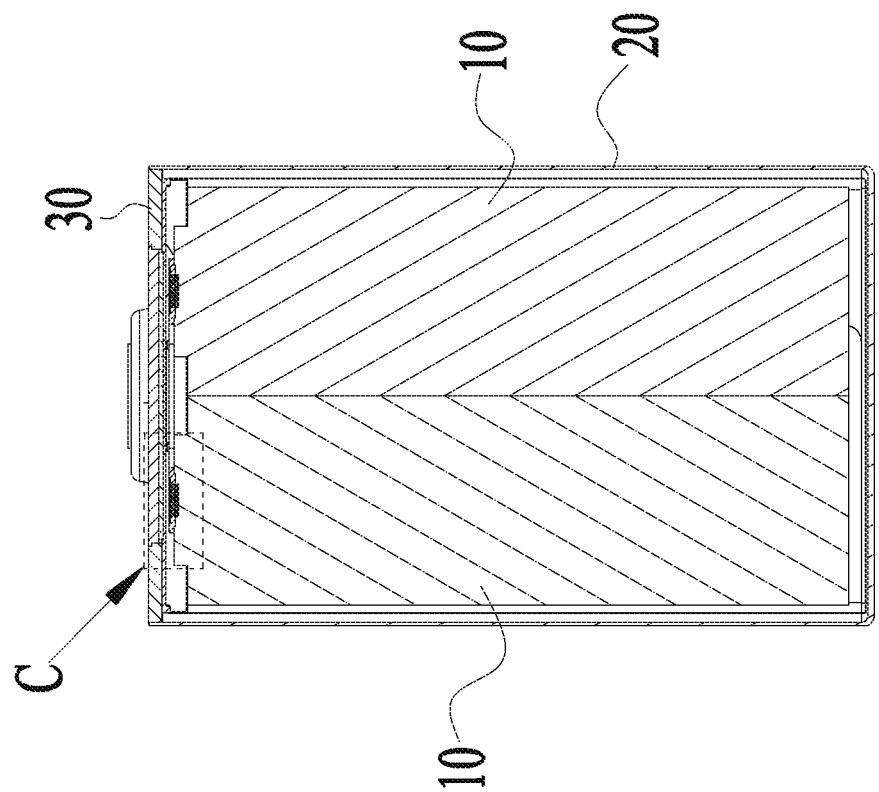
FIG. 7 is a schematic sectional view of the battery cell shown in FIG. 5 taken along line B-B.
Figure 8:
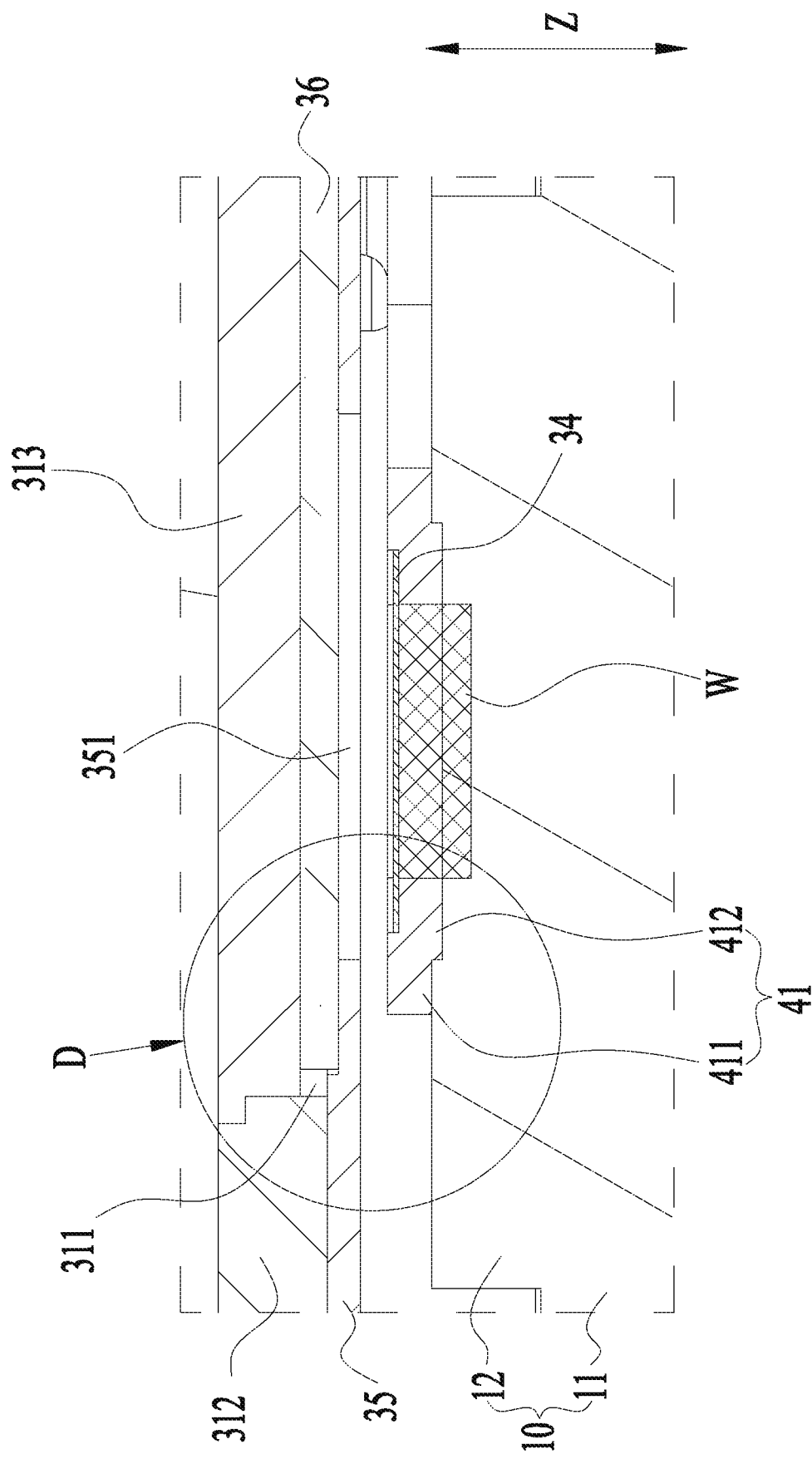
FIG. 8 is an enlarged view of the battery cell shown in FIG. 7 at the square frame C.
Figure 9:
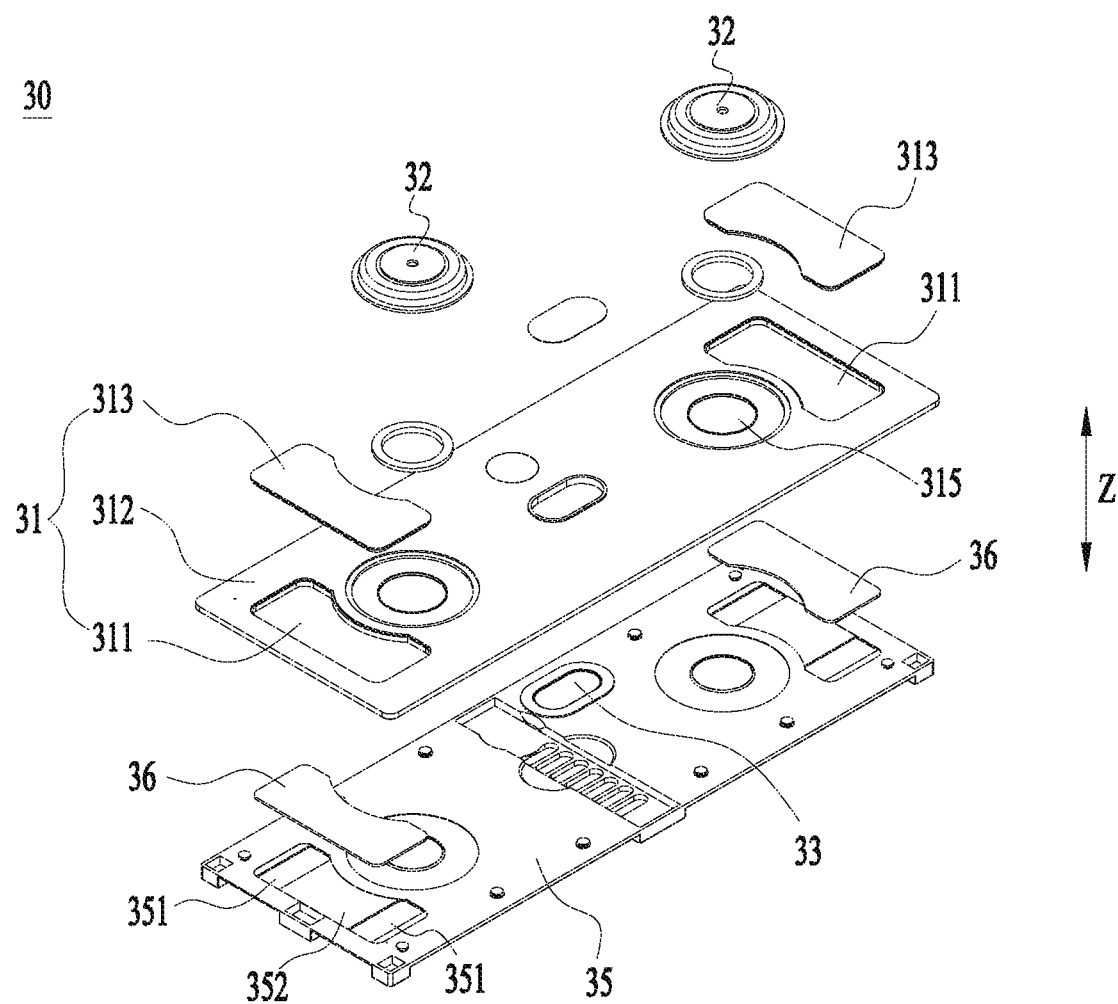
FIG. 9 is an exploded view of an end cover assembly of a battery cell provided in some embodiments of the application.
Figure 10:
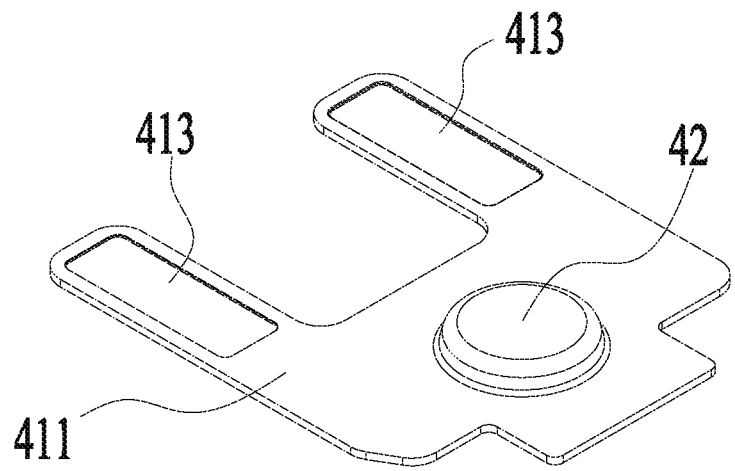
FIG. 10 is a schematic structural diagram of a current collecting member of a battery cell provided in some embodiments of the application.
Figure 11:
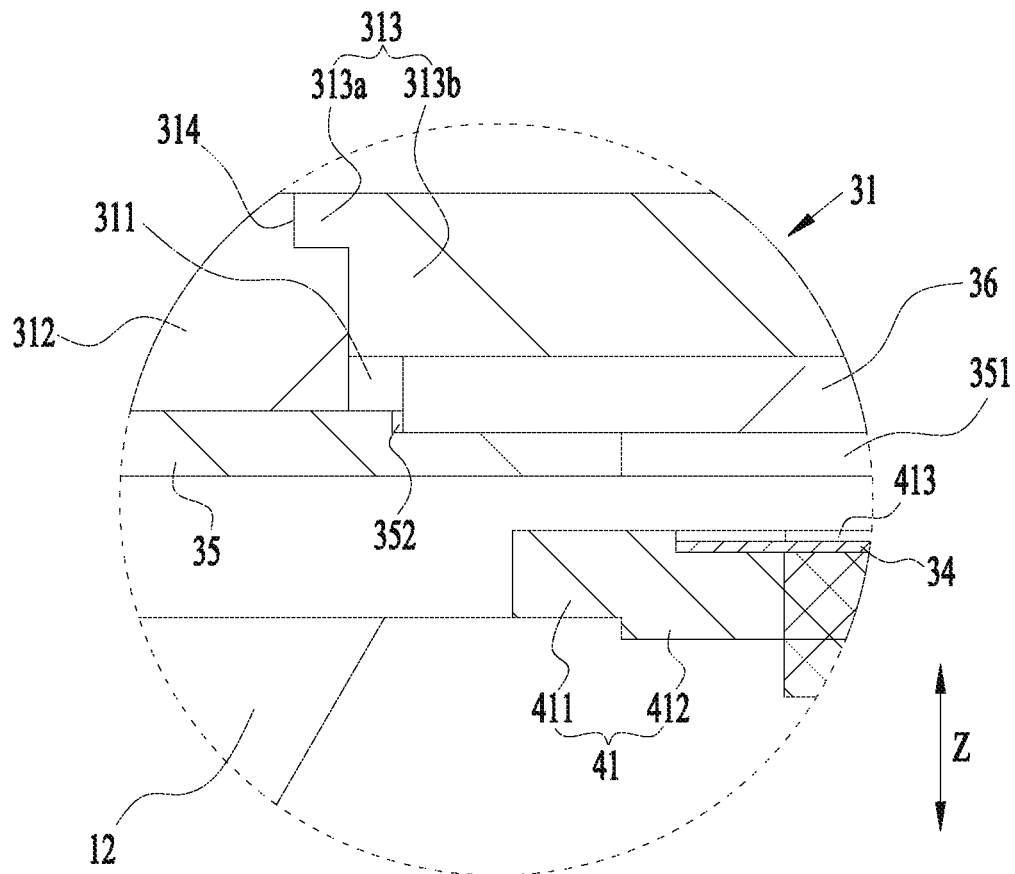
FIG. 11 is an enlarged view of the battery cell shown in FIG. 8 at the round frame D.

FIG. 7 is a schematic sectional view of the battery cell shown in FIG. 5 taken along line B-B; FIG. 8 is an enlarged view of the battery cell shown in FIG. 7 at the square frame C; FIG. 9 is an exploded view of an end cover assembly of a battery cell provided in some embodiments of the application; FIG. 10 is a schematic structural diagram of a current collecting member of a battery cell provided in some embodiments of the application; and FIG. 11 is an enlarged view of the battery cell shown in FIG. 8 at the round frame D.

As shown in FIG. 7 to FIG. 11, in some embodiments, the end cover 31 is provided with a first through hole 311 running through the end cover 31 in a thickness direction Z of the end cover 31.

The first connecting portion 41 is connected to the tab portion 12 to form a connecting region W. That is, in the connecting region W, the first connecting portion 41 and the tab portion 12 are connected to each other. The connecting region W is configured to achieve the transmission of current between the first connecting portion 41 and the tab portion 12.

Projection of the connecting region W of the first connecting portion 41 and the tab portion 12 in the thickness direction Z of the end cover 31 at least partially overlaps with projection of the first through hole 311 in the thickness direction Z. It should be noted that the projection of the connecting region W in the thickness direction Z refers to orthogonal projection of the connecting region W in a plane perpendicular to the thickness direction Z, and projection of the first through hole 311 in the thickness direction Z refers to orthogonal projection of the first through hole 311 in the plane perpendicular to the thickness direction Z.

In some embodiments, the battery cell 7 of the application can be assembled in the following steps: putting the electrode assembly 10 into the casing 20 through the opening of the casing 20; connecting the second connecting portion 42 of the current collecting member 40 to the electrode terminal 32 of the end cover assembly 30; covering the end cover 31 of the end cover assembly 30 over the opening of the casing 20, and connecting the end cover 31 to the casing 20; connecting the current collecting member 40 and the tab portion 12 through the first through hole 311 of the end cover 31 to form the connecting region W; and sealing the first through hole 311 of the end cover 31.

According to the embodiments of the application, the current collecting member 40 can be connected to the tab portion 12 after the end cover 31 is connected to the casing 20 by forming the first through hole 311 on the end cover 31. When connecting the current collecting member 40 to the electrode terminal 32, the electrode assembly 10 is not connected to the current collecting member 40, therefore, impurities produced when connecting the current collecting member 40 to the electrode terminal 32 will not be sputtered onto the electrode assembly 10. When connecting the first connecting portion 41 of the current collecting member 40 to the tab portion 12, the electrode assembly 10 is accommodated in an accommodating cavity formed by the casing 20 and the end cover 31, such that the casing 20 and the end cover 31 can act as a barrier, thereby reducing the risk that impurities in the environment are attached to the electrode assembly 10, and improving the safety performance of the battery cell 7.

With the end cover 31 hermetically connected to the casing 20, the first through hole 311 allows at least part of the first connecting portion 41 to be exposed, and the first connecting portion 41 can be connected to the tab portion 12 through the first through hole 311 by an external device. With the first connecting portion 41 connected to the tab portion 12, the projection of the connecting region W of the first connecting portion 41 and the tab portion 12 in the thickness direction Z at least partially overlaps with the projection of the first through hole 311 in the thickness direction Z.

The first connecting portion 41 can be connected to the tab portion 12 in several ways.

In some embodiments, the first connecting portion 41 is welded to the tab portion 12 to form a welding region included in the connecting region W. In the welding region, the resistance between the first connecting portion 41 and the tab portion 12 is low, which facilitates the transmission of current between the first connecting portion 41 and the tab portion 12.

Exemplarily, during welding, laser passes through the first through hole 311 and acts on the first connecting portion 41, a part of the first connecting portion 41 is melted and welded to the tab portion 12 to form a welding region. The first connecting portion 41 and the tab portion 12 are welded by laser from one side of the first connecting portion 41, and the first connecting portion 41 can block metallic particles generated by welding, thereby reducing the risk of sputtering metallic particles onto the electrode assembly 10.

In some embodiments, the laser is emitted in a direction parallel to the thickness direction Z.

In some other embodiments, the first connecting portion 41 is bonded to the tab portion 12 to form a bonding region included in the connecting region W. For example, the first connecting portion 41 may be bonded to the tab portion 12 through a conductive adhesive that can reduce resistance and facilitate the transmission of current between the first connecting portion 41 and the tab portion 12.

Exemplarily, the first connecting portion 41 is provided with a plurality of through slits (not shown). The conductive adhesive is coated on the first connecting portion 41 through the first through hole 311 by an external device, and the conductive adhesive flows between the first connecting portion 41 and the tab portion 12 through these slits to bond the first connecting portion 41 to the tab portion 12.

In some other embodiments, the first connecting portion 41 is crimped to the tab portion 12 to form a crimping region included in the connecting region W. In the crimping region, the first connecting portion 41 is pressed against the tab portion 12 to keep the first connecting portion 41 in contact with the tab portion 12, thereby reducing the resistance between the first connecting portion 41 and the tab portion 12, which facilitates the transmission of current between the first connecting portion 41 and the tab portion 12.

Exemplarily, a support (not shown) is placed between the end cover 31 and the first connecting portion 41 through the first through hole 311 by an external device, and the support is pressed against the first connecting portion 41, such that the first connecting portion 41 is crimped to the tab portion 12.

Certainly, in the application, the first connecting portion 41 may also be connected to the tab portion 12 by riveting or other means not limited to the above means.

In some embodiments, the projection of the connecting region W in the thickness direction Z is within the projection of the first through hole 311 in the thickness direction Z. That is, in the embodiments, it is not necessary to connect a part, that does not overlap with the first through hole 311 in the thickness direction Z, of the first connecting portion 41 to the tab portion 12, which can simplify the process of connecting the tab portion 12 to the first connecting portion 41. Taking a welding process as an example, when welding the tab portion 12 to the first connecting portion 41, laser can be simply emitted in a direction parallel to the thickness direction Z.

In some embodiments, the first connecting portion 41 is located at one side, facing the end cover 31, of the tab portion 12, and includes a base portion 411 and a protrusion portion 412 connected to the base portion 411, the protrusion portion 412 protrudes with respect to a surface, facing the tab portion 12, of the base portion 411. The protrusion portion 412 is configured to connect the tab portion 12 to form the connecting region W.

The protrusion portion 412 is configured to be pressed against the tab portion 12, such that the protrusion portion 412 is in close contact with the tab portion 12, which is convenient for connecting the protrusion portion 412 with the tab portion 12 by an external device. With the end cover assembly 30 assembled to the casing 20, the current collecting member 40 is arranged between the tab portion 12 and the end cover assembly 30 in an interference fit manner, and the end cover assembly 30 presses the current collecting member 40 to press the protrusion portion 412 against the tab portion 12.

Exemplarily, the protrusion portion 412 is pressed against the tab portion 12, such that when the protrusion portion 412 is welded to the tab portion 12, the risk of pseudo soldering can be reduced, and the strength of connection between the protrusion portion 412 and the tab portion 12 can be improved.

The base portion 411 is largely flat. Exemplarily, the number of the protrusion portion 412 is the same as that of the electrode assembly 10 of the battery cell 7. In some embodiments, two protrusion portions 412 are provided and connected to the second connecting portion 42 through the base portion 411.

In some embodiments, the base portion 411 is in contact with the tab portion 12 to increase the current passing area between the current collecting member 40 and the tab portion 12 and increase the current passing capacity. The protrusion portion 412 squeezes the tab portion 12 to make the tab portion 12 locally recessed, such that both the base portion 411 and the protrusion portion 412 can contact the tab portion 12 at the same time.

In some embodiments, one side, away from the tab portion 12, of the protrusion portion 412 is provided with a recessed portion 413 recessed with respect to a surface, away from the electrode assembly 10, of the base portion 411. The protrusion portion 412 can be formed by a stamping process, and a recessed portion 413 is formed at a stamped position of the current collecting member 40.

The battery cell further includes a first insulating member 34, at least part of the first insulating member 34 is accommodated in the recessed portion 413 and covers the connecting region W. After the first connecting portion 41 is connected to the tab portion 12, some impurities may remain on the surface of the connecting region W. Taking a welding process as an example, some metallic particles will remain on the surface of the connecting region W after welding, and these metallic particles may fall into the electrode assembly 10 and trigger the risk of short circuit. According to the embodiments of the application, metallic particles are held in place by arranging the first insulating member 34, thereby reducing the risk that the metallic particles fall into the electrode assembly 10. The recessed portion 413 can locate the first insulating member 34 to facilitate assembly of the first insulating member 34. In addition, the recessed portion 413 can also provide a space for the first insulating member 34 to reduce the space occupied by the current collecting member 40 and the first insulating member 34 in a thickness direction.

In some examples, the first insulating member 34 is cured from an insulating colloid. Specifically, after the first connecting portion 41 is connected to the tab portion 12, the insulating colloid is dropped into the recessed portion 413 through the first through hole 311 by an external device to form the first insulating member 34 covering the connecting region W after curing.

In some other examples, the first insulating member 34 is an insulating patch. Specifically, after the first connecting portion 41 is connected to the tab portion 12, the insulating patch is placed in the recessed portion 413 through the first through hole 311 by an external device and bonded to the protrusion portion 412.

In some embodiments, the projection of the first insulating member 34 in the thickness direction Z is within the projection of the first through hole 311 in the thickness direction Z. The projection of the first insulating member 34 in the thickness direction Z is orthographic projection of the first insulating member 34 in a plane perpendicular to the thickness direction Z.

In some embodiments, the first insulating member 34 is completely accommodated in the recessed portion 413.

In some embodiments, the battery cell further includes a second insulating member (not shown) which is arranged at one side, away from the connecting region W, of the first insulating member 34 and covers the connecting region W. The first insulating member 34 and the second insulating member can provide double protection to reduce the risk that impurities enter the electrode assembly 10.

In some embodiments, the end cover assembly 30 includes a third insulating member 35 arranged at one side, facing the electrode assembly 10, of the end cover 31. The third insulating member 35 is configured to separate the electrode assembly 10 from the end cover 31 to reduce the risk of short circuit. The third insulating member 35 is fixed to a surface, facing the electrode assembly 10, of the end cover 31. In some embodiments, the third insulating member 35 is made of a plastic.

The first connecting portion 41 is located between the third insulating member 35 and the tab portion 12. The third insulating member 35 is provided with a second through hole 351 running through the third insulating member 35 in the thickness direction Z. The projection of the connecting region W in the thickness direction Z at least partially overlaps with projection of the second through hole 351 in the thickness direction Z.

The second through hole 351 is configured to expose the first connecting portion 41, and the first connecting portion 41 is connected with the tab portion 12 through the first through hole 311 and the second through hole 351 by an external device.

In some embodiments, the projection of the second through hole 351 in the thickness direction Z is within the projection of the first through hole 311 in the thickness direction Z. In some embodiments, the projection of the first insulating member 34 in the thickness direction Z is within the projection of the second through hole 351 in the thickness direction Z.

In some embodiments, the end cover assembly 30 includes a fourth insulating member 36 connected to the third insulating member 35, the fourth insulating member 36 is arranged at one side, away from the electrode assembly 10, of the third insulating member 35 and covers the second through hole 351. The fourth insulating member 36 is configured to insulate the end cover 31 from the first connecting portion 41 to prevent the first connecting portion 41 from electrically connecting the end cover 31 through the second through hole 351. In some embodiments, the fourth insulating member 36 is an insulating patch bonded to the third insulating member 35.

Exemplarily, during the assembly of the battery cell 7, the first connecting portion 41 is connected to the tab portion 12 through the first through hole 311 and the second through hole 351, then the first insulating member 34 is put into the recessed portion 413 through the first through hole 311 and the second through hole 351 to cover the connecting region W, and the fourth insulating member 36 is put through the first through hole 311 to cover the second through hole 351.

In some embodiments, the projection of the fourth insulating member 36 in the thickness direction Z is within the projection of the first through hole 311 in the thickness direction Z.

In some embodiments, at least part of the fourth insulating member 36 is accommodated in the first through hole 311. The first through hole 311 can reserve a space for the fourth insulating member 36, such that the fourth insulating member 36 can have a sufficient thickness to reduce the risk that the fourth insulating member 36 is pierced by impurities. Exemplarily, the fourth insulating member 36 is integrally located within the first through hole 311. A surface, facing the end cover 31, of the third insulating member 35 is affixed to the end cover 31, and the fourth insulating member 36 may be bonded to a surface, facing the end cover 31, of the third insulating member 35.

In some other embodiments, the third insulating member 35 is provided with a first groove 352 recessed with respect to a surface, facing the end cover 31, of the third insulating member 35. The second through hole 351 extends from a bottom wall of the first groove 352 in the thickness direction Z and runs through the third insulating member 35. at least part of the fourth insulating member 36 is accommodated in the first groove 352 and connected to the bottom wall of the first groove 352. The first groove 352 may have a locating effect to facilitate assembly of the fourth insulating member 36. The first groove 352 can also reserve a space for the fourth insulating member 36, such that the fourth insulating member 36 can have a sufficient thickness to reduce the risk that the fourth insulating member 36 is pierced by impurities. Exemplarily, the fourth insulating member 36 is integrally located within the first groove 352.

In some other embodiments, a part of the fourth insulating member 36 is accommodated in the first through hole 311, and another part of the fourth insulating member 36 is accommodated in the first groove 352, which allows more space to be reserved for the fourth insulating member 36.

In some embodiments, the end cover 31 includes an end cover body 312 and a sealing plate 313. The end cover body 312 is configured to connect the casing 20 and cover the opening of the casing 20. The first through hole 311 runs through the end cover body 312 in the thickness direction Z. The sealing plate 313 is configured to seal the first through hole 311 to ensure the tightness of the battery cell 7.

In some embodiments, the end cover body 312 includes a second groove 314 recessed with respect to a surface, away from the electrode assembly 10, of the end cover body 312. The first through hole 311 extends from a bottom wall of the second groove 314 in the thickness direction Z to run through the end cover body 312. The sealing plate 313 is at least partially accommodated in the second groove 314 and abuts against the bottom wall of the second groove 314. The second groove 314 may have a locating function to facilitate assembly of the sealing plate 313 and the end cover body 312. The second groove 314 can also provide an accommodating space for the sealing plate 313 to reduce the overall size of the end cover 31 in the thickness direction Z. Exemplarily, a periphery of the sealing plate 313 is welded to a side wall of the second groove 314.

In some embodiments, a surface, away from the electrode assembly 10, of the end cover body 312 is flush with a surface, away from the electrode assembly 10, of the sealing plate 313, which prevents the sealing plate 313 from occupying additional space in the thickness direction Z and improves the energy density of the battery cell 7.

In some embodiments, the sealing plate 313 includes a first sealing portion 313a accommodated in the second groove 314 and welded to the end cover body 312, and a second sealing portion 313b connected to the first sealing portion 313a and accommodated in the first through hole 311. The second sealing portion 313b is pressed against the fourth insulating member 36, such that the fourth insulating member 36 is closely attached to the third insulating member 35.

In some specific embodiments, the battery cell 7 of the application can be assembled in the following steps:
 putting the electrode assembly 10 into the casing 20 through the opening of the casing 20;
 welding the second connecting portion 42 of the current collecting member 40 to the electrode terminal 32 of the end cover assembly 30;
 covering the end cover body 312 of the end cover assembly 30 over the opening of the casing 20, and connecting the end cover body 312 to the casing 20, where the electrode terminal 32, the third insulating member 35 and other components are preassembled onto the end cover body 312;
 acting, by laser, on the first connecting portion 41 through the first through hole 311 and the second through hole 351 to connect the first connecting portion 41 to the tab portion 12 to form the connecting region W;
 dropping an insulating colloid into the recessed portion 413 of the first connecting portion 41 through the first through hole 311 and the second through hole 351 to form the first insulating member 34 covering the connecting region W after the insulating colloid is cured;
 bonding the fourth insulating member 36 to the third insulating member 35 through the first through hole 311 to allow the fourth insulating member 36 to cover the second through hole 351; and
 welding the sealing plate 313 to the end cover body 312 to seal the first through hole 311.

Figure 12:
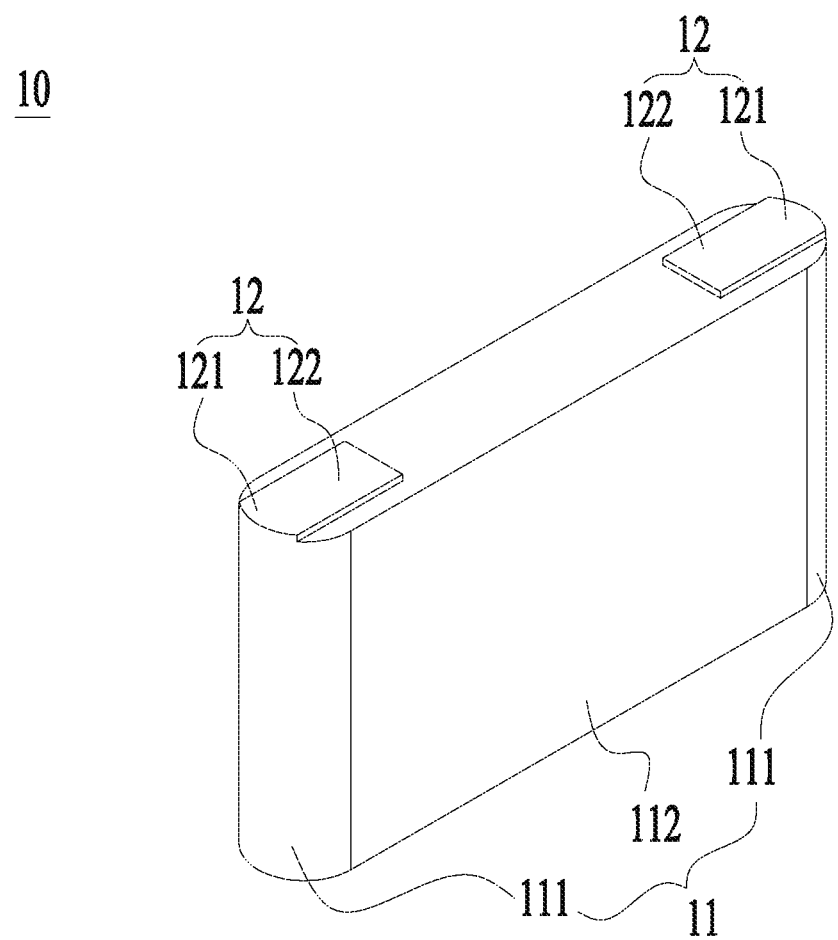
FIG. 12 is a schematic structural diagram of an electrode assembly of a battery cell provided in some embodiments of the application.
Figure 13:
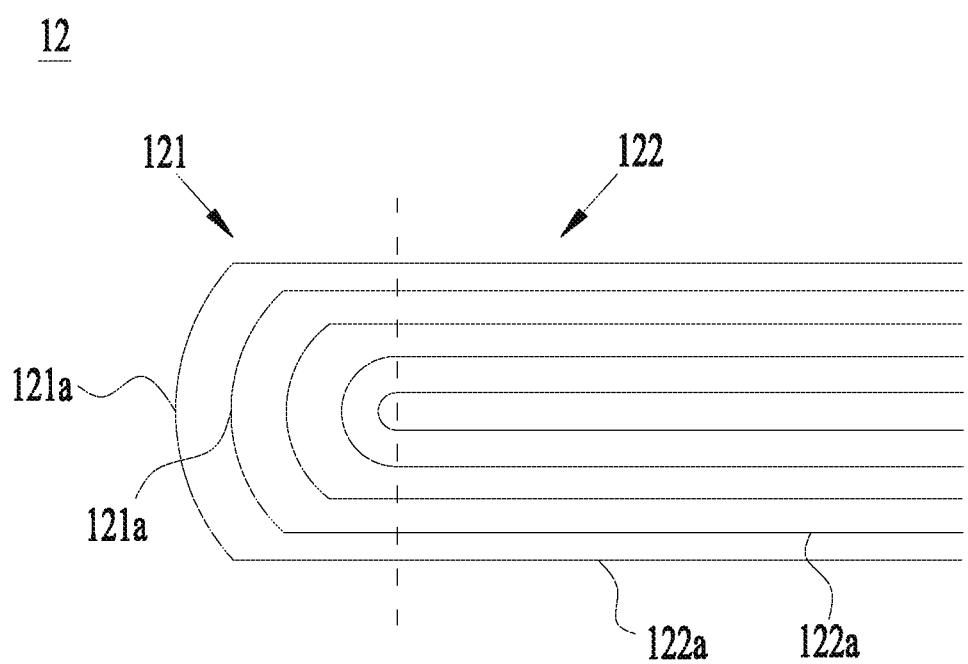
FIG. 13 is a schematic structural diagram of a tab portion shown in FIG. 12.

FIG. 12 is a schematic structural diagram of an electrode assembly of a battery cell provided in some embodiments of the application; and FIG. 13 is a schematic structural diagram of a tab portion shown in FIG. 12.

As shown in FIG. 12, the body portion 11 in the embodiments of the application is a winding structure and includes a bent region 111. The bent region 111 is a region in which the body portion 11 has a bent structure. A portion, located in the bent region 111, of the positive pole piece and a portion, located in the bent region 111, of the negative pole piece are arranged in a bending manner. Exemplarily, the part, located in the bent region 111, of the positive pole piece and the part, located in the bent region 111, of the negative pole piece are both arc-shaped.

In some embodiments, the tab portion 12 includes a first part 121 extending from the bent region 111, with at least part of the first part 121 connected to the first connecting portion 41.

The first part 121 includes a plurality of bent tab portions 121a which are laminated. The bent tab portions 121a in the first part 121 of the positive tab portion are a part, connected to the bent region 111, of a positive tab, and the bent tab portions 121a in the first part 121 of the negative tab portion are a part, connected to the bent region 111, of a negative tab.

When the electrode assembly 10 is prepared, the plurality of bent tab portions 121a can be rolled to bring the plurality of bent tab portions 121a close to each other, so as to reduce the gap between the bent tab portions 121a. One end, away from the bent region 111, of the plurality of bent tab portions 121a approximately forms a dense end face, and the end face is a surface of the first part 121 for connecting to the first connecting portion 41. In this way, when the first connecting portion 41 is connected to the first part 121 by welding, the strength of connection between the first connecting portion 41 and the first part 121 can be ensured in the embodiments of the application, thereby reducing the risk of burning the electrode assembly 10 due to laser leakage.

In some embodiments, the electrode assembly 10 is flat. The body portion 11 further includes a straight region 112, and two bent regions 111 are respectively connected to both ends of the body portion 11. The straight region 112 is a region in which the electrode assembly 10 has a straight structure, and a portion, located in the straight region 112, of the positive pole piece and a portion, located in the straight region 112, of the negative pole piece are substantially arranged straight.

The tab portion 12 further includes a second part 122 extending from the straight region 112, with at least part of the second part 122 connected to the first connecting portion 41.

The second part 122 includes a plurality of straight tab portions 122a, and a plurality of bent tab portions 121a are laminated. The straight tab portions 122a in the second part 122 of the positive tab portion are a part, connected to the straight region 112, of the positive tab, and the straight tab portions 122a in the second part 122 of the negative tab portion are a part, connected to the straight region 112, of the negative tab.

When the electrode assembly 10 is prepared, the plurality of straight tab portions 122a can be rolled to bring the plurality of straight tab portions 122a close to each other, so as to reduce the gap between the straight tab portions 122a. One end, away from the straight region 112, of the plurality of straight tab portions 122a approximately forms a dense end face, and the end face is a surface of the second part 122 for connecting to the first connecting portion 41. In this way, when the first connecting portion 41 is connected to the second part 122 by welding, the strength of connection between the first connecting portion 41 and the second part 122 can be ensured in the embodiments of the application, thereby reducing the risk of burning the electrode assembly 10 due to laser leakage.

In the related art, the size of the tab portion protruding from the body portion is large, and the space occupied by the tab portion is reduced by bending. In the embodiments of the application, an end, away from the body portion 11, of the tab portion 12 is connected to the first connecting portion 41, and the size of the tab portion 12 protruding from the body portion 11 is small, such that the tab portion 12 does not need to be bent integrally, thereby reducing the space occupied by the tab portion 12 and providing energy density.

Figure 14:
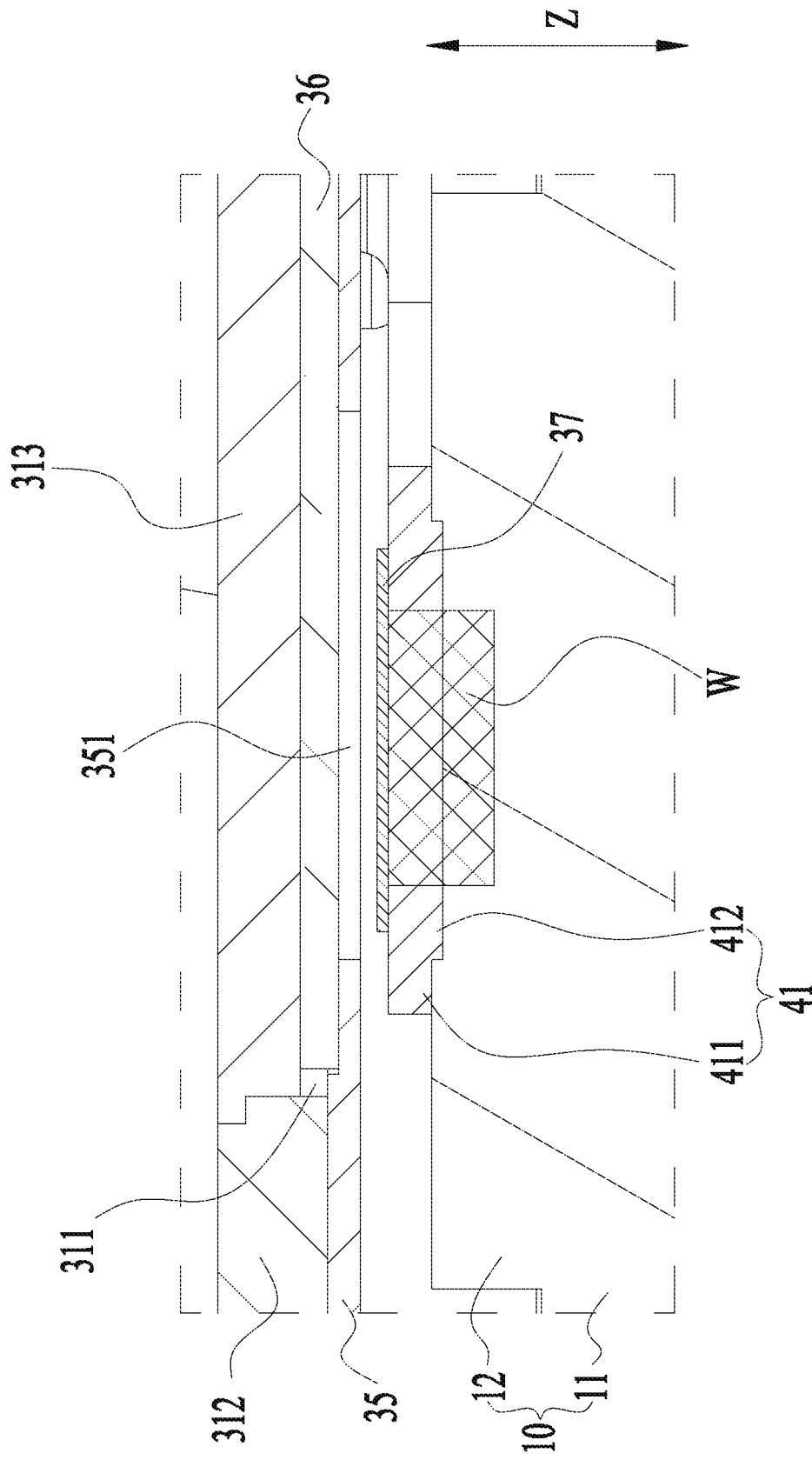
FIG. 14 is a local sectional view of a battery cell provided in some other embodiments of the application.

FIG. 14 is a local sectional view of a battery cell provided in some other embodiments of the application.

As shown in FIG. 14, in some embodiments, the battery cell further includes a second insulating member 37 which is arranged at one side, away from the tab portion 12, of the first connecting portion 41 and covers the connecting region W. Exemplarily, the second insulating member 37 is an insulating patch and is bonded to a surface, away from the tab portion 12, of the first connecting portion 41.

Figure 15:
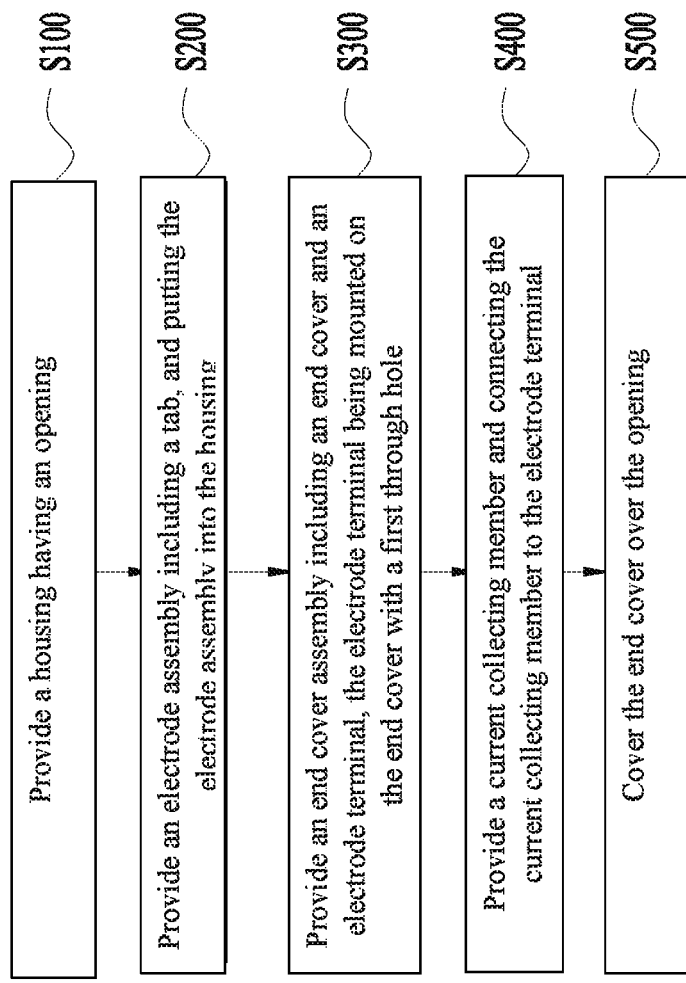
FIG. 15 is a schematic flow chart of a method for manufacturing a battery cell provided in some embodiments of the application.

FIG. 15 is a schematic flow chart of a method for manufacturing a battery cell provided in some embodiments of the application.

As shown in FIG. 15, the method for manufacturing the battery cell in the embodiments of the application includes:

S100. providing a casing having an opening;

S200. providing an electrode assembly including a tab portion, and putting the electrode assembly into the casing;

S300. providing an end cover assembly including an end cover and an electrode terminal, the electrode terminal being mounted on the end cover with a first through hole;

S400. providing a current collecting member and connecting the current collecting member to the electrode terminal; and S500. covering the end cover over the opening;

where the current collecting member is configured to electrically connect the electrode terminal and the tab portion, and includes a first connecting portion for connecting the tab portion, and projection of a connecting region of the first connecting portion and the tab portion in a thickness direction of the end cover at least partially overlaps with projection of the first through hole in the thickness direction.

It should be noted that for relevant structures of battery cells manufactured by the method for manufacturing the battery cell, refer to the battery cell provided in the above embodiments.

When assembling battery cells based on the method for manufacturing the battery cell, it is not necessary to follow the above steps sequentially, that is, the steps can be performed in the sequence mentioned in the embodiments, or in a sequence different from that mentioned in the embodiments, or several steps can be performed simultaneously. For example, step S100 and step S300 may be performed in any sequence, or performed simultaneously.

Figure 16:
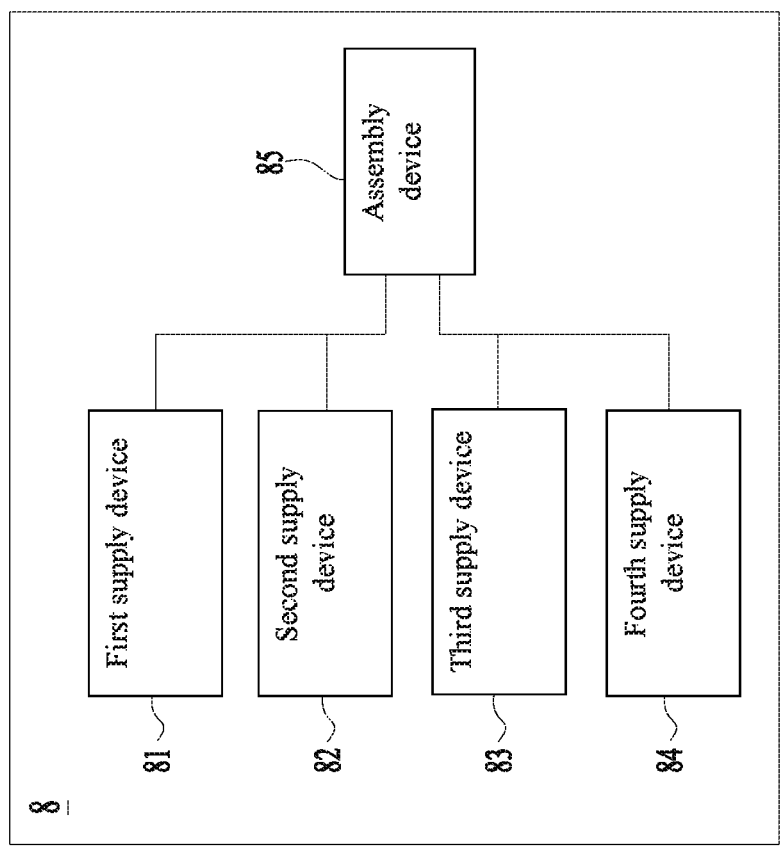
FIG. 16 is a schematic block diagram of a system for manufacturing a battery cell provided in some embodiments of the application.

FIG. 16 is a schematic block diagram of a system for manufacturing a battery cell 7 provided in some embodiments of the application.

As shown in FIG. 16, the manufacturing system 8 of the battery cell in the embodiments of the application includes: a first supply device 81, configured to supply a casing having an opening; a second supply device 82, configured to supply an electrode assembly including a tab portion, and put the electrode assembly into the casing; a third supply device 83, configured to supply an end cover assembly including an end cover and an electrode terminal, the electrode terminal being mounted on the end cover with a first through hole; a fourth supply device 84, configured to supply a current collecting member and connect the current collecting member to the electrode terminal; and an assembly device 85, configured to cover the end cover over the opening.

Where the current collecting member is configured to electrically connect the electrode terminal and the tab portion, and includes a first connecting portion for connecting the tab portion, and projection of a connecting region of the first connecting portion and the tab portion in a thickness direction of the end cover at least partially overlaps with projection of the first through hole in the thickness direction.

For relevant structures of battery cells manufactured by the manufacturing system, refer to the battery cell provided in the above embodiments.

It should be noted that the embodiments in the application and features in the embodiments may be combined with one another if there is no conflict.

Finally, it should be noted that the above embodiments are merely used to describe the technical solution of the application, rather than limiting the same. Although the application has been described in detail with reference to the foregoing embodiments, those skilled in the art should understand that the technical solution described in the foregoing embodiments may still be modified, or some of the technical features therein may be equivalently replaced. However, these modifications or substitutions do not make the essence of the corresponding technical solutions deviate from the spirit and scope of the technical solutions of each embodiment of the application.

What is claimed is:

1. A battery cell, comprising:
a casing provided with an opening;
an electrode assembly, accommodated in the casing and comprising a tab portion;
an end cover assembly, comprising an end cover to cover the opening and an electrode terminal mounted on the end cover, the end cover being provided with a first through hole; and
a current collector to electrically connect the electrode terminal and the tab portion, wherein the current collector comprises a first connecting portion for connecting the tab portion, and projection of a connecting region of the first connecting portion and the tab portion in a thickness direction of the end cover at least partially overlaps with projection of the first through hole in the thickness direction,
wherein projection of the electrode terminal in the thickness direction does not overlap with the projection of the first through hole in the thickness direction,
the end cover assembly comprises a third insulator arranged at one side, facing the electrode assembly, of the end cover, the first connecting portion is located between the third insulator and the tab portion, and
the third insulator is provided with a second through hole, and the projection of the connecting region in the thickness direction at least partially overlaps with projection of the second through hole in the thickness direction.

2. The battery cell according to claim 1, wherein the first connecting portion is located at one side, facing the end cover, of the tab portion, and comprises a base portion and a protrusion portion connected to the base portion, the protrusion portion protruding with respect to a surface, facing the tab portion, of the base portion:
the protrusion portion being configured to connect the tab portion to form the connecting region.

3. The battery cell according to claim 2, wherein the base portion is in contact with the tab portion.

4. The battery cell according to claim 2, wherein one side, away from the tab portion, of the protrusion portion is provided with a recessed portion recessed with respect to a surface, away from the electrode assembly, of the base portion.

5. The battery cell according to claim 4, further comprising a first insulator, at least part of the first insulator being accommodated in the recessed portion and covering the connecting region.

6. The battery cell according to claim 1, further comprising a second insulator which is arranged at one side, away from the tab portion, of the first connecting portion and covers the connecting region.

7. The battery cell according to claim 1, wherein the end cover assembly comprises a fourth insulator connected to the third insulator, the fourth insulator being arranged at one side, away from the electrode assembly, of the third insulator and covering the second through hole.

8. The battery cell according to claim 7, wherein at least part of the fourth insulator is accommodated in the first through hole.

9. The battery cell according to claim 7, wherein the third insulator is provided with a first groove recessed with respect to a surface, facing the end cover, of the third insulator:
the second through hole extending from the bottom wall of the first groove in the thickness direction; and
at least part of the fourth insulator being accommodated in the first groove and connected to the bottom wall of the first groove.

10. The battery cell according to claim 1, wherein the projection of the connecting region in the thickness direction is within the projection of the first through hole in the thickness direction.

11. The battery cell according to claim 1, wherein the first connecting portion is welded to the tab portion to form a welding region included in the connecting region.

12. The battery cell according to claim 1, wherein the electrode assembly further comprises a body portion, the tab portion extending from one end, near the end cover, of the body portion:
the body portion being a winding structure and comprising bent regions, and the tab portion comprising a first part extending from the bent regions, with at least part of the first part connected to the first connecting portion.

13. The battery cell according to claim 12, wherein the body portion further comprises a straight region, with the two bent regions respectively connected to both ends of the body portion:
the tab portion further comprising a second part extending from the straight region, with at least part of the second part connected to the first connecting portion.

14. The battery cell according to claim 1, wherein the end cover comprises an end cover body for connecting the casing, and a sealing plate for sealing the first through hole.

15. The battery cell according to claim 14, wherein the end cover body comprises a second groove recessed with respect to a surface, away from the electrode assembly, of the end cover body:
the first through hole extending from a bottom wall of the second groove in the thickness direction; and
the sealing plate being at least partially accommodated in the second groove and abutting against the bottom wall of the second groove.

16. The battery cell according to claim 15, wherein a surface, away from the electrode assembly, of the end cover body is flush with a surface, away from the electrode assembly, of the sealing plate.

17. A battery, comprising a box and the battery cell according to claim 1, the battery cell being accommodated in the box.

18. An electric device, comprising the battery according to claim 17, the battery being configured to provide electrical energy.

19. A method for manufacturing a battery cell, comprising:
providing a casing provided with an opening;
providing an electrode assembly comprising a tab portion, and putting the electrode assembly into the casing;
providing an end cover assembly comprising an end cover and an electrode terminal, the electrode terminal being mounted on the end cover with a first through hole;
providing a current collector and connecting the current collector to the electrode terminal; and
covering the end cover over the opening;
wherein the current collector electrically collects the electrode terminal and the tab portion, and comprises a first connecting portion for connecting the tab portion, and projection of a connecting region of the first connecting portion and the tab portion in a thickness direction of the end cover at least partially overlaps with projection of the first through hole in the thickness direction,
projection of the electrode terminal in the thickness direction does not overlap with the projection of the first through hole in the thickness direction,
the end cover assembly comprises a third insulator arranged at one side, facing the electrode assembly, of the end cover, the first connecting portion is located between the third insulator and the tab portion, and
the third insulator is provided with a second through hole, and the projection of the connecting region in the thickness direction at least partially overlaps with projection of the second through hole in the thickness direction.

* * * * *